US012730565B2

(12) United States Patent
Lee et al.

(10) Patent No.: US 12,730,565 B2
(45) Date of Patent: Sep. 8, 2026

(54) MEMORY DEVICE AND OPERATING METHOD FOR SNEAK CURRENT MEASUREMENT AND DATA RECOVERY

(71) Applicant: SK hynix Inc., Icheon-si (KR)

(72) Inventors: Seung Yun Lee, Icheon-si (KR); Tae Young Moon, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 112 days.

(21) Appl. No.: 18/765,799

(22) Filed: Jul. 8, 2024

(65) Prior Publication Data

US 2025/0251867 A1 Aug. 7, 2025

(30) Foreign Application Priority Data

Feb. 2, 2024 (KR) ........................ 10-2024-0016497

(51) Int. Cl.
*G06F 3/06* (2006.01)

(52) U.S. Cl.
CPC .......... *G06F 3/0619* (2013.01); *G06F 3/0656* (2013.01); *G06F 3/0659* (2013.01); *G06F 3/0673* (2013.01)

(58) Field of Classification Search
CPC .... G06F 3/0619; G06F 3/0656; G06F 3/0659; G06F 3/0673
See application file for complete search history.

(56) References Cited

U.S. PATENT DOCUMENTS 5,359,558 A * 10/1994 Chang ................ G11C 16/3404 365/210.11
9,312,002 B2 4/2016 Navon et al.
10,497,441 B2 * 12/2019 Lesartre ............. G11C 13/0023
2002/0190742 A1 * 12/2002 Ooishi .............. G01R 31/3187 324/750.3
2006/0013030 A1 * 1/2006 Arimoto ............. G11C 11/4087 365/63
2012/0147680 A1 * 6/2012 Koike .................... G11C 5/147 365/189.011
2014/0355326 A1 * 12/2014 Okawa ................ G11C 29/808 365/63
2015/0070994 A1 * 3/2015 Hosono ................. G11C 16/08 365/185.11
2015/0380085 A1 * 12/2015 Park .................... G11C 11/1675 365/148
2016/0211025 A1 * 7/2016 Joo ..................... G11C 11/5642
2017/0269856 A1 * 9/2017 Ouyang ................. G11C 16/32
2019/0006020 A1 * 1/2019 Sundaresan ...... G11C 29/12005
2019/0006021 A1 * 1/2019 Ghai ................... G11C 11/5628

* cited by examiner

*Primary Examiner* — Pho M Luu
*Assistant Examiner* — Elizabeth Rose Agger

(57) ABSTRACT

A memory device may include a memory cell array in which a plurality of decks are stacked, a control circuit configured to perform a read or write operation on a target deck of the plurality of decks, a current detection circuit configured to measure a sneak current flowing through at least one deck among the plurality of decks, the at least one deck being adjacent to the target deck and a buffer configured to store data transferred from memory cells of the at least one deck, wherein the control circuit is configured to execute a read or write command to perform the read or write operation on the target deck after the sneak current flowing through the at least one deck is measured.

19 Claims, 11 Drawing Sheets

MEMORY DEVICE AND OPERATING METHOD FOR SNEAK CURRENT MEASUREMENT AND DATA RECOVERY

CROSS-REFERENCE TO RELATED APPLICATION

This application claims priority under 35 U.S.C. § 119 to Korean Patent Application No. 10-2024-0016497 filed on Feb. 2, 2024, which is incorporated herein by reference in its entirety.

BACKGROUND

1. Technical Field

Embodiments relate to an integrated circuit technology and, more particularly, to a memory device and an operating method thereof.

2. Related Art

Recently, as an electronic device is reduced in size, has low power consumption and high performance, and is diversified, a semiconductor device capable of storing information is required for various electronic devices, such as computers and portable communication devices. The semiconductor device may be basically classified into a volatile memory device and a nonvolatile memory device. The volatile memory device can retain data only in the state in which power is supplied to the volatile memory device. The nonvolatile memory device can retain data although power is not supplied to the nonvolatile memory device.

A representative nonvolatile memory device is NAND type memory, and includes ferroelectric RAM (FRAM), magnetic RAM (MRAM), phase-change RAM (PRAM), polymer RAM (PORAM), and resistance RAM (ReRAM) as next-generation memory that is now being developed.

SUMMARY

In an embodiment, a memory device may include a memory cell array in which a plurality of decks are stacked, a control circuit configured to perform a read or write operation on a target deck of the plurality of decks, a current detection circuit configured to measure a sneak current flowing through at least one deck among the plurality of decks, the at least one deck being adjacent to the target deck and a buffer configured to store data transferred from memory cells of the at least one deck, wherein the control circuit is configured to execute a read or write command to perform the read or write operation on the target deck after the sneak current flowing through the at least one deck is measured.

In an embodiment, an operating method of a memory device may include receiving a command to perform a read or write operation on a target deck that is determined as having difficulty in storing or outputting data among a plurality of decks stacked within a memory cell array of the memory device, measuring a sneak current flowing through a first deck among the plurality of decks, the first deck being adjacent to the target deck, comparing the sneak current with a preset current, transferring, into a buffer, data stored in memory cells of the first deck based on a result of the comparison, storing reset data in the memory cells of the first deck, performing the read or write operation on the target deck in response to the command and writing, into the memory cells of the first deck, the data stored in the buffer.

DETAILED DESCRIPTION

Hereinafter, embodiments according to the technical spirit of the present disclosure are described with reference to the accompanying drawings.

Embodiments of the present disclosure provide a memory device of a semiconductor system capable of improving the reliability of a write operation, and an operating method of the memory device.

According to the embodiments, although a sneak current is higher than a preset current, a write operation can be performed on a memory cell normally.

Figure 1:
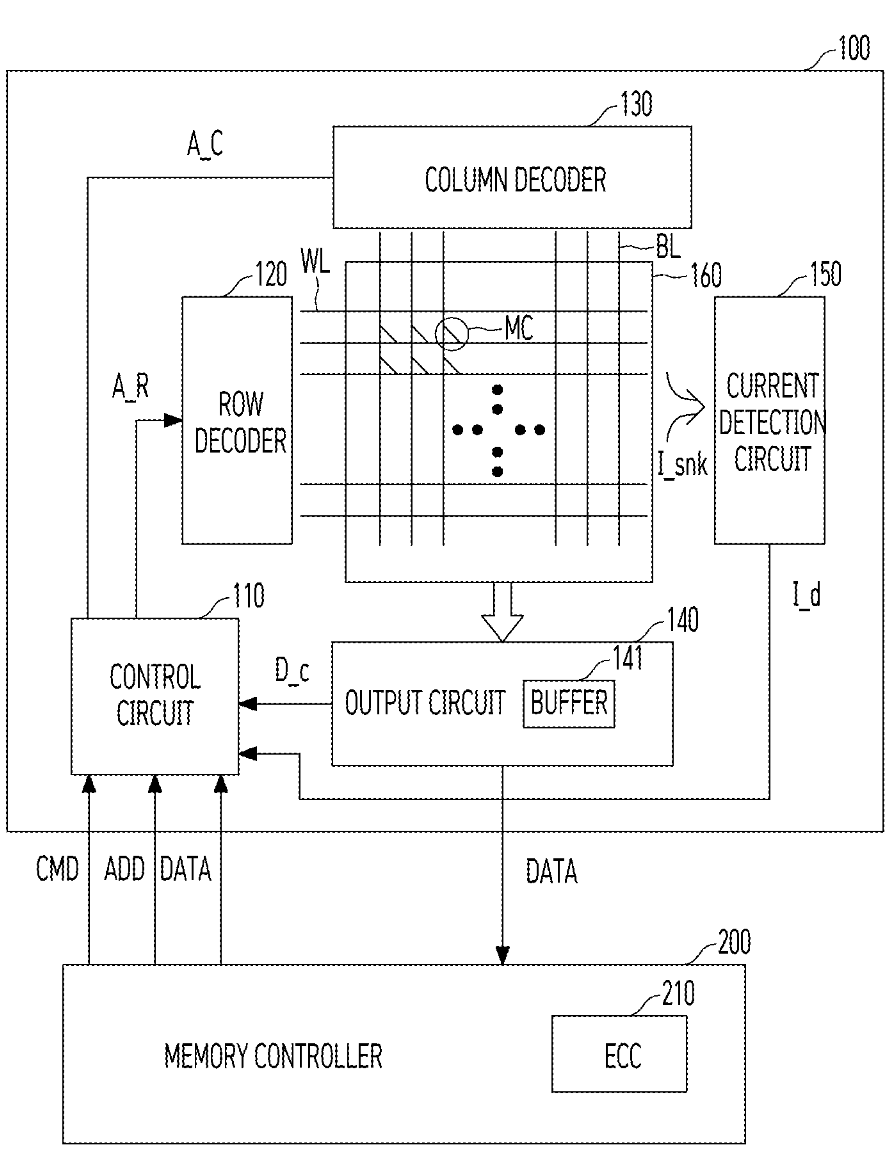
FIG. 1 illustrates a semiconductor system according to an embodiment of the present disclosure.

FIG. 1 illustrates a semiconductor system according to an embodiment of the present disclosure.

Referring to FIG. 1, the semiconductor system may include a memory device 100 and a memory controller 200.

The memory device 100 may receive a command CMD, an address ADD, and data DATA from the memory controller 200. The memory device 100 may store therein the data DATA received from the memory controller 200 or transmit data DATA stored therein to the memory controller 200, based on the command CMD and the address ADD.

The memory device 100 may include a control circuit 110, a row decoder 120, a column decoder 130, an output circuit 140, a current detection circuit 150, and a memory cell array 160.

The control circuit 110 may receive the command CMD, the address ADD, and the data DATA from the memory controller 200. The control circuit 110 may control at least one of the row decoder 120, the column decoder 130, the output circuit 140, or the current detection circuit 150 based on at least one of the command CMD, the address ADD, or the data DATA.

The control circuit 110 may control the row decoder 120 based on one or more of the command CMD, the address ADD, and the data DATA. The control circuit 110 may control the row decoder 120 to select at least one of a plurality of word lines WL based on one or more of the command CMD, the address ADD, and the data DATA.

Furthermore, the control circuit 110 may drive the at least one word line WL with a first voltage by controlling the row decoder 120. In this case, the first voltage may be a positive voltage or a negative voltage.

The control circuit 110 may control the column decoder 130 based on one or more of the command CMD, the address ADD, and the data DATA. The control circuit 110 may control the column decoder 130 to select at least one of a plurality of bit lines BL, based on one or more of the command CMD, the address ADD, and the data DATA. Furthermore, the control circuit 110 may drive the at least one bit line BL with a second voltage by controlling the column decoder 120. In this case, the second voltage may be a positive voltage or a negative voltage.

The first voltage and the second voltage may have different voltage levels. For example, when a selected word line is driven with the first voltage having a positive voltage level, a selected bit line may be driven with the second voltage having a negative voltage level. Alternatively, when a selected word line is driven with the first voltage having a negative voltage level, a selected bit line may be driven with the second voltage having a positive voltage level.

The control circuit 110 may control the output circuit 140 based on the command CMD. The control circuit 110 may detect data stored in a memory cell that is connected between the selected word line and the selected bit line based on the command CMD, and may control the output circuit 140 to transmit the detected data to the memory controller 200.

The control circuit 110 may control the current detection circuit 150 based on the command CMD and the address ADD. The control circuit 110 may detect a sneak current I_snk flowing through the memory cell array 160, and may control the current detection circuit 150 to output a detection result I_d. When the sneak current I_snk that has been detected from the memory cell array 160 is equal to or greater than a preset current, the control circuit 110 may control the row decoder 120, the column decoder 130, and the output circuit 140 to perform a preparation operation of the memory device 100 according to an embodiment of the present disclosure.

The row decoder 120 may be provided with a row address A_R from the control circuit 110. The row decoder 120 may select at least one word line from among the plurality of word lines WL based on the row address A_R, and may drive the selected word line with the first voltage.

The column decoder 130 may be provided with a column address A_C from the control circuit 120. The column decoder 130 may select at least one bit line from among the plurality of bit lines BL based on the column address A_C, and may drive the selected bit line with the second voltage.

The output circuit 140 may detect data stored in a memory cell MC through the word line WL or the bit line BL, and may output the detected data. The output circuit 140 may include a buffer 141, and may store the detected data in the buffer 141. Furthermore, the output circuit 140 may provide the control circuit 110 with the data stored in the buffer 141 as detection data D_c.

The current detection circuit 150 may detect the sneak current I_snk flowing through the memory cell array 160 through the plurality of word lines WL or the plurality of bit lines BL, and may provide the control circuit 110 with a detection result as sneak current information I_d.

The memory cell array 160 may include the plurality of word lines WL, the plurality of bit lines BL, and a plurality of memory cells MC. The memory cell array 160 may include the plurality of memory cells MC that are connected between the plurality of word lines WL and the plurality of bit lines BL, respectively. The plurality of word lines WL may extend in a first direction, and the plurality of bit lines BL may extend in a second direction crossing the first direction.

The memory controller 200 may provide the memory device 100 with at least one of the command CMD, the address ADD, or the data DATA, and may be provided with the data DATA from the memory device 100. The memory controller 200 may include an error correction code (ECC) circuit 210, and may correct an error in the data DATA received from the memory device 100. Furthermore, when the number of errors in the received data DATA is greater than a preset number, the memory controller 200 may check a memory region within the memory cell array 160 in which the received data DATA has been stored. For example, when the memory controller 200 provides the memory device 100 with the command CMD for performing a read or write operation on the checked memory region within the memory cell array 160, the memory controller 200 may measure the sneak current I_snk flowing through the memory cell array 160, and may provide the memory device 100 with a command CMD based on results of the measurement.

Figure 2:
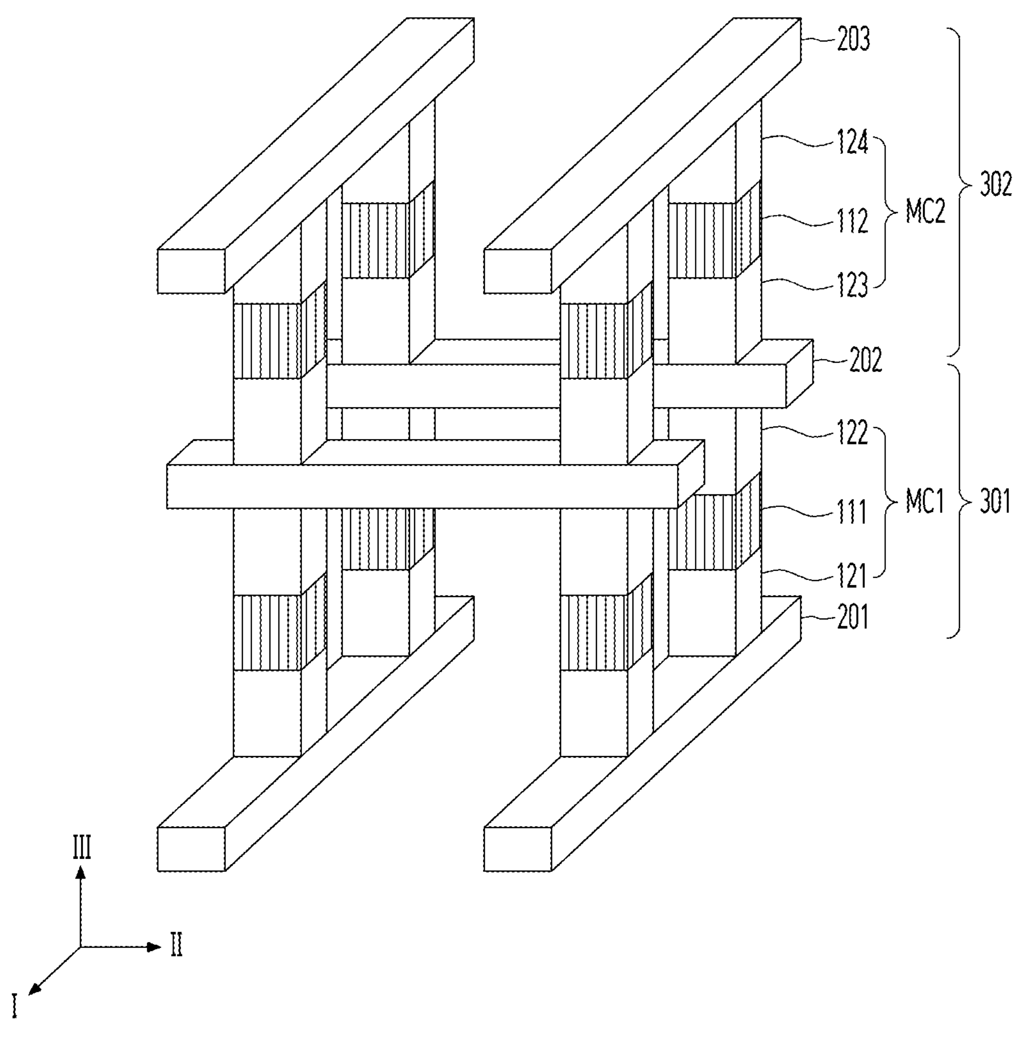
FIG. 2 is a perspective view of a memory cell array of a memory device according to an embodiment of the present disclosure.
Figure 3A:
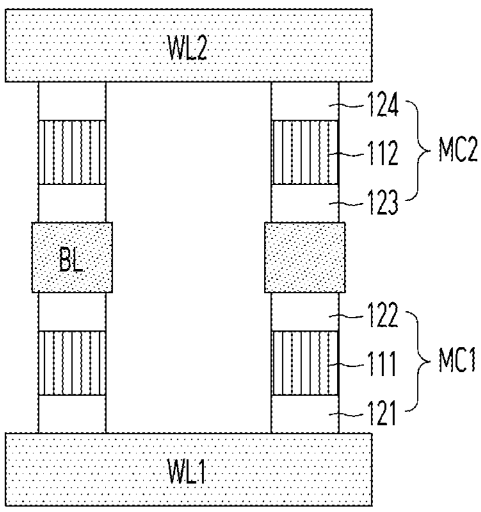
FIGS. 3A and 3B are cross-sectional views of the memory cell array shown in FIG. 2.
Figure 3A:
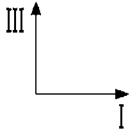
Figure 3B:
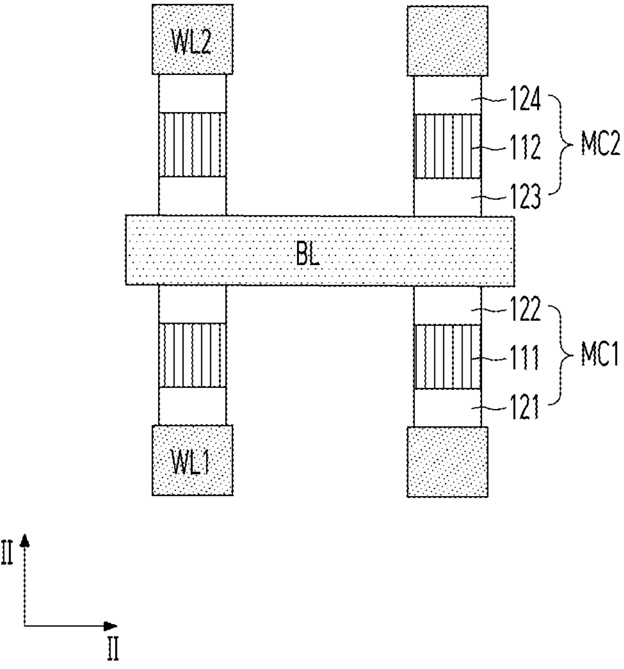

FIG. 2 is a perspective view of a memory cell array of a memory device according to an embodiment of the present disclosure. FIGS. 3A and 3B are cross-sectional views of the memory cell array shown in FIG. 2. The memory device shown in FIGS. 2, 3A, and 3B may correspond to the memory cell array 160 of the memory device 100 shown in FIG. 1.

Referring to FIGS. 2, 3A, and 3B, the memory cell array 160 of the memory device 100 may include a first memory deck 301 and a second memory deck 302. The second memory deck 302 may be stacked on the first memory deck 301 in a third direction III. In this case, a first direction I may be a direction that intersects a second direction II. The third direction III may be a direction that is orthogonal to a plane that is defined by the first direction I and the second direction II.

The first memory deck 301 may include at least one first access line 201, at least one first memory cell MC1, and at least one second access line 202.

The first access line 201 may extend in the first direction I. The second access line 202 may extend in the second direction II. The first access line 201 and the second access line 202 may be stacked in the third direction III. The first access line 201 and the second access line 202 may either function as a word line and a bit line respectively, or vice versa. In an embodiment, the first access line 201 may be a word line, and the second access line 202 may be a bit line. Alternatively, the first access line 201 may be a bit line, and the second access line 202 may be a word line. Both the first access line 201 and the second access line 202 may include a conductive material, such as polysilicon or metal.

The first memory cell MC1 may be disposed in a region at which the first access line 201 and the second access line 202 intersect with each other. The first memory cell MC1 may be connected between the first access line 201 and the second access line 202. A plurality of first memory cells MC1 may be arranged in the first direction I and the second direction II between at least one first access line 201 and at least one second access line 202.

The first memory cell MC1 may include a first lower electrode 121, a first variable resistance layer 111, and a first upper electrode 122. For reference, the first memory cell MC1 may include a switching layer instead of the first variable resistance layer 111, or may include a switching layer in addition to the variable resistance layer 111. The first variable resistance layer 111, or the switching layer, or both may be disposed between the first lower electrode 121 and the first upper electrode 122.

In an embodiment, the first lower electrode 121, the first variable resistance layer 111, and the first upper electrode 122 may be stacked in the third direction III. The first lower electrode 121 may be electrically connected to the first access line 201. The first upper electrode 122 may be electrically connected to the second access line 202.

In an embodiment, the first variable resistance layer 111 may include a variable resistance material whose resistance can be varied without undergoing a phase change, and may include a chalcogenide-based material. Both the first lower electrode 121 and the first upper electrode 122 may include a conductive material, such as carbon or metal nitride.

The second memory deck 302 may include the at least one second access line 202, at least one second memory cell MC2, and at least one third access line 203.

As described above, the second access line 202 may extend in the second direction II, and the third access line 203 may extend in the first direction I. The third access line 203 may be stacked over the second access line 202 in the third direction III. The third access line 203 may be a word line or a bit line. In an embodiment, when the second access line 202 is a word line, the third access line 203 may be a bit line. Alternatively, when the second access line 202 is a bit line, the third access line 203 may be a word line. In an embodiment, like the first and second access lines 201 and 202, the third access line 203 may include metal, such as tungsten W.

The second memory cell MC2 may be disposed in a memory region where the second access line 202 and the third access line 203 intersect with each other. The second memory cell MC2 may be connected between the second access line 202 and the third access line 203. A plurality of second memory cells MC2 may be arranged in the first direction I and the second direction II between at least one second access line 202 and at least one third access line 203.

The second memory cell MC2 may include a second lower electrode 123, a second variable resistance layer 112, and a second upper electrode 124. For reference, like the first memory cell MC1, the second memory cell MC2 may also include a switching layer instead of the second variable resistance layer 112, or may include a switching layer in addition to the second variable resistance layer 112. The second variable resistance layer 112, or the switching layer, or both may be disposed between the second lower electrode 123 and the second upper electrode 124.

In an embodiment, the second lower electrode 123, the second variable resistance layer 112, and the second upper electrode 124 may be stacked in the third direction III. The second lower electrode 123 may be electrically connected to the second access line 202. The second upper electrode 124 may be electrically connected to the third access line 203.

In an embodiment, the second variable resistance layer 112 may include a variable resistance material whose resistance can be varied without undergoing a phase change, and may include a chalcogenide-based material. Both the first lower electrode 121 and the first upper electrode 122 may include a conductive material, such as carbon or metal nitride.

As described above, the first memory deck 301 and the second memory deck 302 may be stacked in the third direction III. The first memory deck 301 and the second memory deck 302 may share at least one second access line 202. In this case, when the first and third access lines 201 and 203 are word lines, the second access line 202 may be a bit line.

In the memory cell array 160 of the memory device 100, for example, as illustrated in FIGS. 3A and 3B, the first access line 201 may be a first word line WL1 of the first memory deck 301, the second access line 202 may be a bit line BL that is shared by the first memory deck 301 and the second memory deck 302, and the third access line 203 may be a second word line WL2 of the second memory deck 302.

Referring to FIGS. 3A and 3B, the first memory deck 301 may include at least one first word line WL1, at least one bit line BL, and at least one first memory cell MC1. The first word line WL1 may extend in the first direction I, and the bit line BL may extend in the second direction II. The first memory cell MC1 may be disposed between the first word line WL1 and the bit line BL, and may be electrically connected to the first word line WL1 and the bit line BL. In this case, the first word line WL1, the first memory cell MC1, and the bit line BL may be stacked in the third direction III.

The second memory deck 302 may include at least one second word line WL2, the at least one bit line BL, and at least one second memory cell MC2. The second word line WL2 may extend in the first direction I, and the bit line BL may extend in the second direction II. The second memory cell MC2 may be disposed between the bit line BL and the second word line WL2, and may be electrically connected to the bit line BL and the second word line WL2. In this case, the bit line BL, the second memory cell MC2, and the second word line WL2 may be stacked in the third direction III.

Figure 4A:
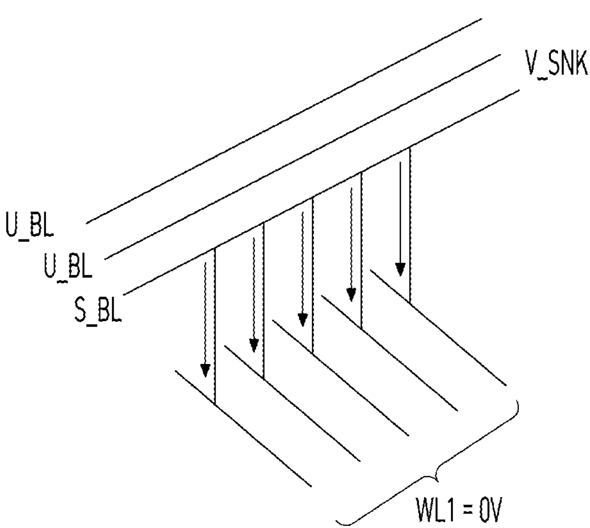
FIGS. 4A and 4B describe a method of measuring a sneak current flowing through a memory cell array according to an embodiment of the present disclosure.
Figure 4B:
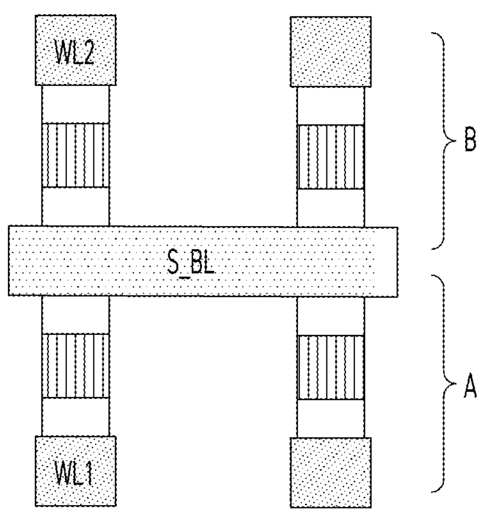

FIGS. 4A and 4B describe a method of measuring a sneak current flowing through a memory cell array according to an embodiment of the present disclosure. The memory cell array shown in FIG. 4B may correspond to the memory cell array shown in FIGS. 2, 3A, and 3B.

In FIG. 4B, the first memory deck 301 of FIG. 3B may be described as a deck A and the second memory deck 302 of FIG. 3B may be described as a deck B, for convenience of description.

FIG. 4A describes an operation of detecting a sneak current I_snk flowing through the deck A.

Referring to FIGS. 4A and 4B, in order to detect the sneak current I_snk flowing through the deck A, second word lines WL2 of the deck B may be left floating, and a sneak current measurement voltage V_SNK may be applied to a selected bit line S_BL. Furthermore, a ground voltage 0 V may be applied to first word lines WL1 of the deck A. At this time, the ground voltage 0 V may be also applied to unselected bit lines U_BL.

The sneak current I_snk of the deck A may be a current that flows from the selected bit line S_BL to the first word lines WL1 of the deck A through first memory cells MC1 of the deck A. The first memory cells MC1 of the deck A are connected between the selected bit line S_BL and the first word lines WL1 to which the ground voltage 0 V is applied. The sneak current I_snk of the deck A may be the same as the sum of currents that flow into the first word lines WL1. At this time, the first memory cells MC1 of the deck A may be turned off as the ground voltage 0 V is applied to the first word lines WL1. Accordingly, the sneak current I_snk of the deck A may be measured through the first word lines WL1 of the deck A.

Similarly, a sneak current I_snk flowing through the deck B may be detected by measuring currents flowing into the second word lines WL2 when the bit line S_BL has been selected, while the first word lines WL1 are left floating, and when the ground voltage 0 V is applied to the second word lines WL2.

When a voltage is applied to the selected bit line S_BL to access a second memory cell MC2 of the deck B, the sneak current I_snk flowing into the deck A may be generated. Accordingly, if the sneak current I_snk of the deck A is increased, it could lead to a reduction in the voltage level of the selected bit line S_BL owing to the sneak current I_snk of the deck A. As a result, the second memory cell MC2 of the deck B may receive a voltage insufficient to enable its selection from the selected bit line S_BL. This may cause an error during a read operation or a write operation for the second memory cell MC2 of the deck B.

Figure 5:
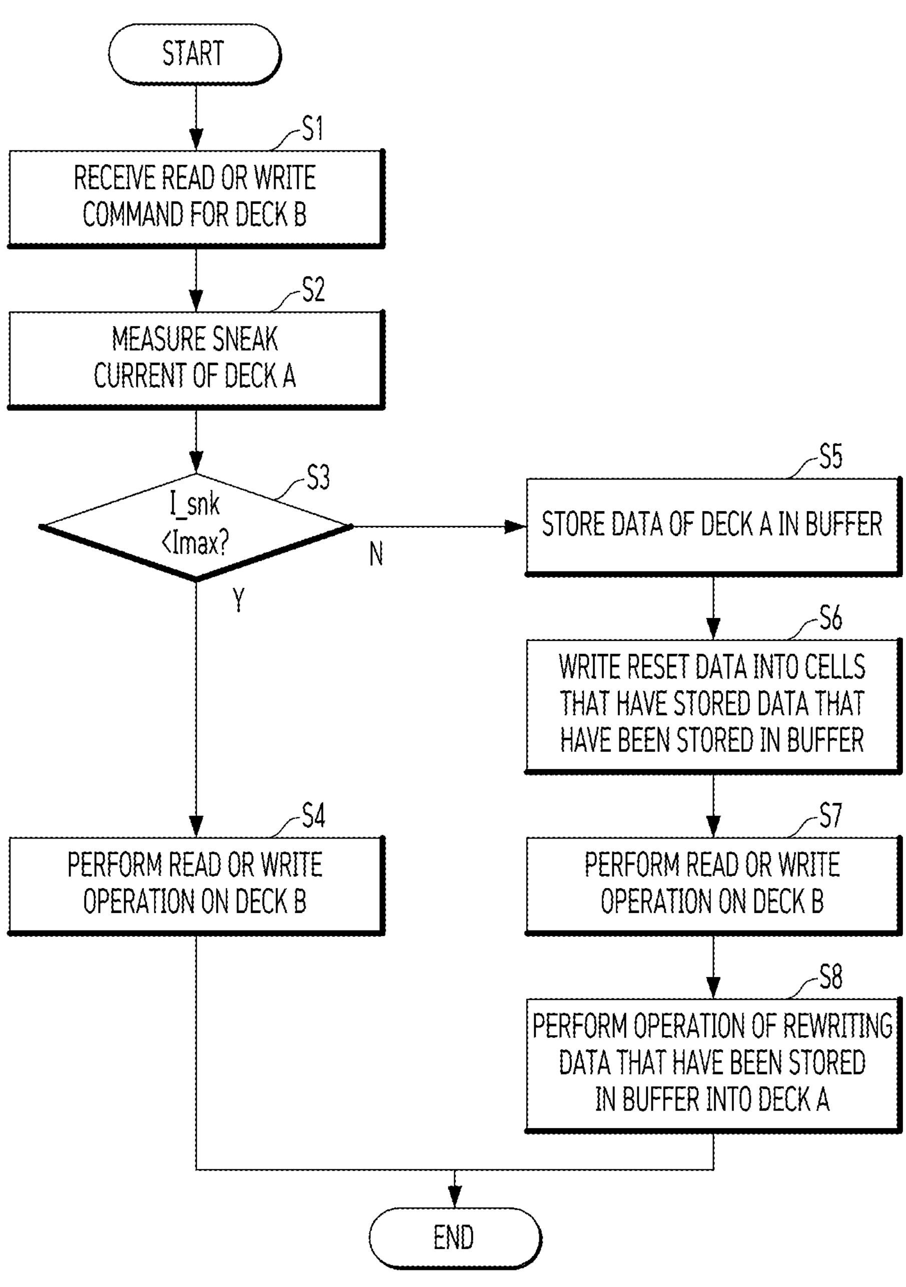
FIG. 5 is a flowchart for describing an operating method of a memory device according to an embodiment of the present disclosure.
Figure 6:
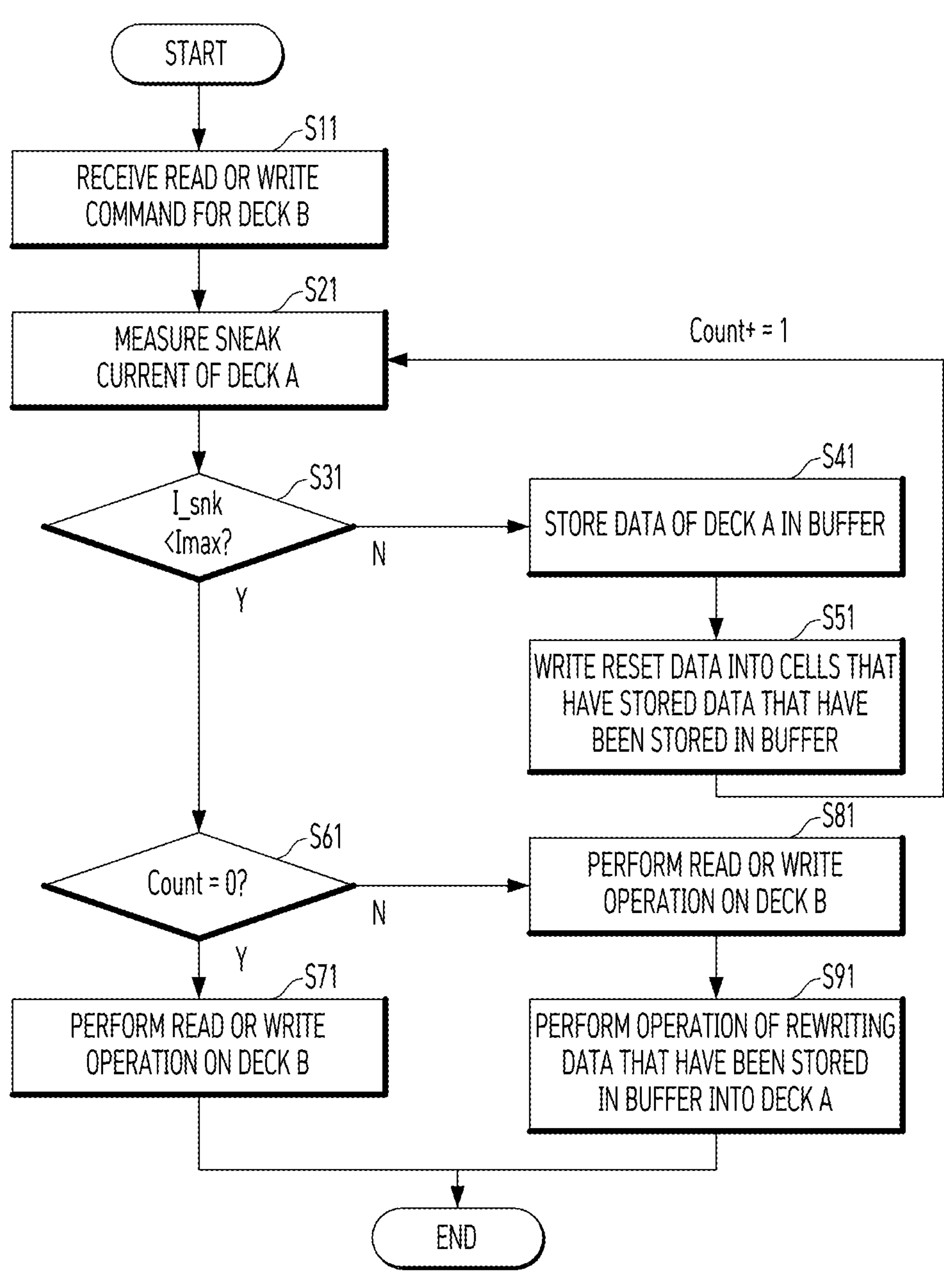
FIG. 6 is a flowchart for describing an operating method of a memory device according to another embodiment of the present disclosure.

FIGS. 5 and 6 are flowcharts for describing operating methods of a memory device according to embodiments of the present disclosure.

The operating methods shown in FIGS. 5 and 6 will be described with reference to the memory cell array 160 of FIG. 1 in which a deck B is stacked on a deck A, as illustrated in FIG. 4B.

In this case, it is assumed that the memory controller 200 determines that the number of errors in data output from the deck B is greater than a preset number. Accordingly, when the memory device 100 receives a command CMD for performing a read or write operation on the deck B from the memory controller 200, the sneak current I_snk of the deck A is measured.

Referring to FIGS. 1 and 5, the operating method of the memory device 100 may include a command reception step S1, a sneak current measurement step S2, a current comparison step S3, a first command execution step S4, a preparation operation execution step including steps S5 and S6, a second command execution step S7, and a recovery step S8.

The command reception step S1 may include receiving a read or write command for the deck B from the memory controller 200. In this case, it is assumed that the deck B is experiencing reliability issues in both storing data received from the memory controller 200 and accurately outputting stored data. For example, as described above, it is assumed that the number of errors in data output from the deck B is greater than the preset number.

The sneak current measurement step S2 may include measuring the sneak current I_snk of the deck A. In this case, as illustrated in FIG. 4B, the deck A may share the bit lines BL with the deck B. The current detection circuit 150 may measure the sneak current I_snk of the deck A for the selected bit line S_BL that is selected by an address, received along with the read or write command, among the bit lines BL that are shared by the deck A and the deck B. That is, when receiving the read or write command for the deck B, the control circuit 110 may control the current detection circuit 150 to measure the sneak current I_snk of the deck A.

The current comparison step S3 may include comparing the sneak current I_snk of the deck A and a preset current Imax. For example, the current comparison step S3 may include receiving, by the control circuit 110, a detection result I_d of the sneak current I_snk of the deck A from the current detection circuit 150 and comparing the received detection result I_d and the preset current Imax. In an embodiment, the preset current Imax may be determined by accessing the current required to transfer a target voltage to the farthest cell from a peripheral circuit during a read or write operation.

When it is determined that the sneak current I_snk of the deck A is smaller than the preset current Imax (Y) in the current comparison step S3, the first command execution step S4 may be performed.

The first command execution step S4 may include executing the read or write command for the deck B without performing the preparation operation execution step, S5 and S6. That is, when the sneak current I_snk of the deck A is smaller than the preset current Imax (Y), the first command execution step S4 including executing the read or write command for the deck B may be performed.

On the other hand, when it is determined in the current amount comparison step S3 that the sneak current I_snk of the deck A is equal to or greater than the preset current Imax (N), the preparation operation execution step, S5 and S6, may be performed.

The preparation operation execution step, S5 and S6, may be performed before the read or write command received in the command reception step S1 is executed, and may include step S5 of transferring data stored in the deck A into the buffer 141 and step S6 of writing reset data into the deck A.

Step S5 of transferring the data stored in the deck A into the buffer 141 may include storing, in the buffer 141, the data stored in memory cells of the deck A that shares the selected bit line S_BL with the deck B.

Step S6 of writing the reset data into the deck A may include writing the reset data into the memory cells of the deck A in which the data currently residing in the buffer 141 was originally stored. In this case, the reset data may be data corresponding to a higher resistance value of a memory cell compared to set data. That is, the resistance value of the memory cell that stores the reset data may be higher than a resistance value of a memory cell that stores the set data. In the operating method of the memory device 100 according to this embodiment of the present disclosure, storing the reset data in the memory cells of the deck A has been described as an example, but embodiments are not limited thereto.

When the preparation operation execution step, S5 and S6 has been completed, the second command execution step S7 may be performed.

The second command execution step S7 may include executing the read or write command on the deck B. That is, the second command execution step S7 may include executing the read or write command on the deck B after the completion of the preparation operation execution step, S5 and S6.

The recovery step S8 may include recovering or restoring the data of the memory cells of the deck A. For example, the recovery step S8 may include rewriting the data from the buffer 141 back into the deck A. In this case, the recovery step S8 may include providing the control circuit 110 with the data stored in the buffer 141 and subsequently storing the data received from the buffer 141, under the control of the control circuit 110, into the corresponding memory cells of the deck A.

As described above, according to the embodiment of the present disclosure, the memory device 100 may include the memory cell array 160 having a form in which the two decks A and B have been stacked by sharing bit lines (or word lines). If an error continuously occurs in a read operation for one specific deck, e.g., the deck B, among the two decks A and B, or if the number of errors occurring in a read operation is increased, when a read or write command for the specific deck B is received, a sneak current of the other deck, e.g., the deck A, may be measured before executing the received read or write command on the deck B. At this time, when the sneak current is equal to or greater than a preset amount, data, which is stored in memory cells connected to a selected bit line among bit lines shared by the two decks A and B, may be transferred into the buffer 141. After that, data (i.e., reset data) corresponding to a high resistance value may be written into the memory cells connected to the selected bit line. Accordingly, a current leakage from a bit line selected when the deck B is accessed can be reduced during a read or write operation for the deck B.

Accordingly, according to the embodiment of the present disclosure described in FIG. 5, the memory device 100 can perform a normal read or write operation.

Referring to FIG. 6, the operating method of the memory device 100 may include a command reception step S11, a sneak current measurement step S21, a current comparison step S31, a step-based preparation operation execution step including steps S41 and S51, a count check step S61, a first command execution step S71, a second command execution step S81, and a recovery step S91.

The command reception step S11 may include receiving a read or write command for the deck B. In this case, it is assumed that the deck B is experiencing reliability issues in both storing data received from the memory controller 200 and accurately outputting data stored in the deck B.

The sneak current measurement step S21 may include measuring a sneak current I_snk of a deck A. In this case, as illustrated in FIG. 4B, the deck A may share bit lines BL with the deck B. The sneak current I_snk of the deck A may be measured by the current detection circuit 150. That is, when receiving the read or write command for the deck B, the control circuit 110 may control the current detection circuit 150 to measure the sneak current I_snk of the deck A.

The current comparison step S31 may include comparing the sneak current I_snk of the deck A and a preset current Imax. For example, the current comparison step S31 may include receiving, by the control circuit 110, a detection result I_d of the sneak current I_snk of the deck A from the current detection circuit 150 and comparing the received detection result I_d and the preset current Imax.

When it is determined in the current comparison step S31 that the sneak current I_snk of the deck A is equal to or greater than the preset current Imax (N), the step-based preparation operation execution step, S41 and S51, may be performed.

The step-based preparation operation execution step, S41 and S51, may include step S41 of transferring data of the deck A into the buffer 141 and step S51 of writing reset data into the deck A.

Step S41 of transferring the data of the deck A into the buffer 141 may include storing, in the buffer 141, first data stored in a first set of memory cells included in the deck A. The deck A shares a selected bit line BL with the deck B. The selected bit line BL is selected by an address that has been received along with the read or write command in the command reception step S11.

Step S51 of writing the reset data into the deck A may include writing the reset data in the first set of memory cells in which the first data was stored. In this case, the reset data may be data corresponding to a higher resistance value of a memory cell compared to set data. That is, the resistance value of the memory cell that stores the reset data may be higher than a resistance value of a memory cell that stores the set data. In the operating method of the memory device 100 according to this embodiment of the present disclosure, storing the reset data in the memory cells of the deck A has been described as an example, but embodiments are not limited thereto.

After step S51 of writing the reset data into the deck A is first performed, the control circuit 110 may increase a counting number by 1 (Count+=1) and perform the sneak current measurement step S21 again. The counting number may be initialized to 0 before the step-based preparation operation execution step, S41 and S51, is first performed.

That is, in the step-based preparation operation execution step, S41 and S51, the first data stored in the first set of memory cells included in the deck A may be transferred into the buffer 141. After that, the reset data may be written into the first set of memory cells. In this case, the sneak current measurement step S21 and the step-based preparation operation execution step, S41 and S51, may be repeatedly performed until it is determined in the current amount comparison step S31 that the sneak current I_snk of the deck A is smaller than the preset current Imax.

For example, after the counting number is increased to 1, if it is determined in the current amount comparison step S31 that the sneak current I_snk of the deck A is still equal to or greater than the preset current Imax, the step-based preparation operation execution step, S41 and S51, is performed again.

When the step-based preparation operation execution step, S41 and S51, is performed again, second data stored in a second set of memory cells included in the deck A may be transferred into the buffer 141. The first set of memory cells may be different from the second set of memory cells. After that, the reset data may be written into the second set of memory cells. At this time, the control circuit 110 may increase the counting number again, so that the counting number becomes 2.

When it is determined in the current comparison step S31 that the sneak current I_snk of the deck A is smaller than the preset amount of current Imax (Y), the count check step S61 may be performed.

The count check step S61 may include checking whether step S51 of writing the reset data into the deck A has been performed at least once.

If it is determined in the count check step S61 that step S51 of writing the reset data into the deck A has not been performed at least once (Count=0) (Y), the first command execution step S71 may be performed.

The first command execution step S71 may include executing the read or write command for the deck B by the memory device 100. In this case, the first command execution step S71 may include executing the read or write command without performing the step-based preparation operation execution step, S41 and S51.

If it is determined in the count check step S61 that step S51 of writing the reset data into the deck A has been performed at least once (Count≠0) (N), the second command execution step S81 may be performed.

The second command execution step S81 may include executing the read or write command for the deck B. In this case, the second command execution step S81 may include executing the read or write command after the step-based preparation operation execution step, S41 and S51, has been performed at least once.

After the second command execution step S81 is performed, the recovery step S91 may be performed.

The recovery step S91 may include retrieving both the first and second data from the buffer 141 and rewriting them into the deck A. For example, the recovery step S91 may include rewriting, into the first and second sets of memory cells of the deck A, the first and second data stored in the buffer 141. In this case, the recovery step S91 may include providing the control circuit 110 with the first and second data stored in the buffer 141 and storing, in the corresponding memory cells of the deck A, e.g., in the first and second sets of memory cells, the first and second data received from the buffer 141, under the control of the control circuit 110.

As described above, according to this embodiment of the present disclosure, the memory device 100 may include the memory cell array 161 having a form in which the two decks A and B have been stacked by sharing bit lines (or word lines). If an error continuously occurs in a read operation for one specific deck B among the two decks A and B, or if the number of errors occurring in a read operation is increased, when a read or write command for the specific deck B is received, the sneak current of the deck A may be measured before the received command is executed. At this time, when the sneak current is equal to or greater than a preset current, the data stored in memory cells connected to a bit line of the deck A, where the sneak current has been measured, among bit lines (or word lines) shared by both decks A and B, may be transferred into the buffer 141. After that, data (i.e., reset data) having a high resistance value may be written into the memory cells connected to the bit line of the deck A. Accordingly, when the specific deck B is accessed to perform the read or write operation, it is possible to mitigate current leakage through the shared bit line (or shared word line), thereby minimizing interference with the other deck A.

Accordingly, according to the embodiment of the present disclosure described in FIG. 6, the memory device 100 can perform a normal read or write operation.

Figure 7A:
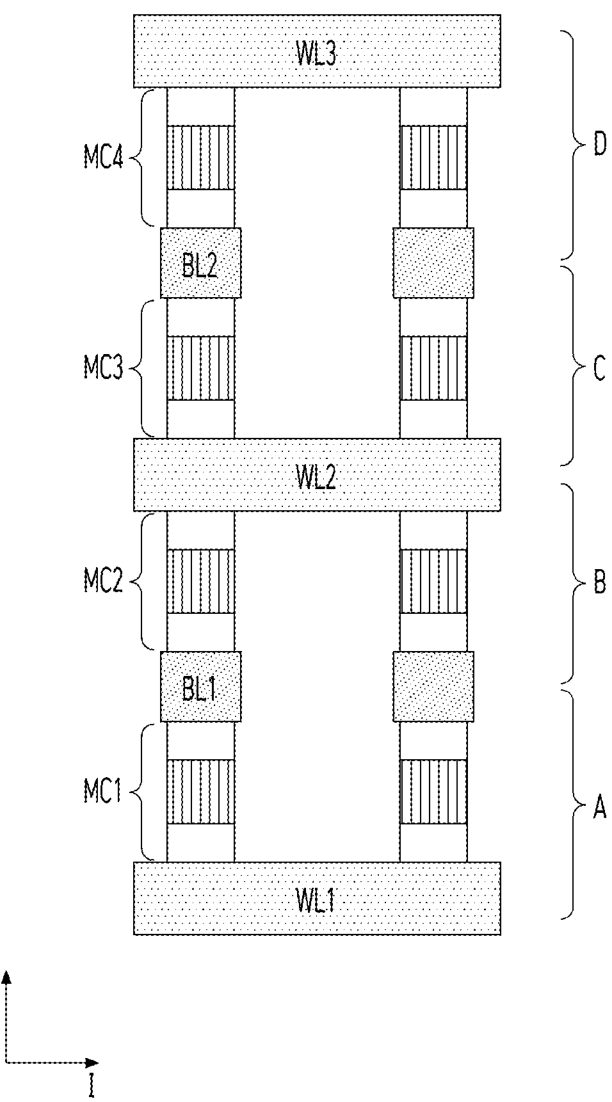
FIGS. 7A and 7B are cross-sectional views of a memory cell array of a memory device according to another embodiment of the present disclosure.
Figure 7B:
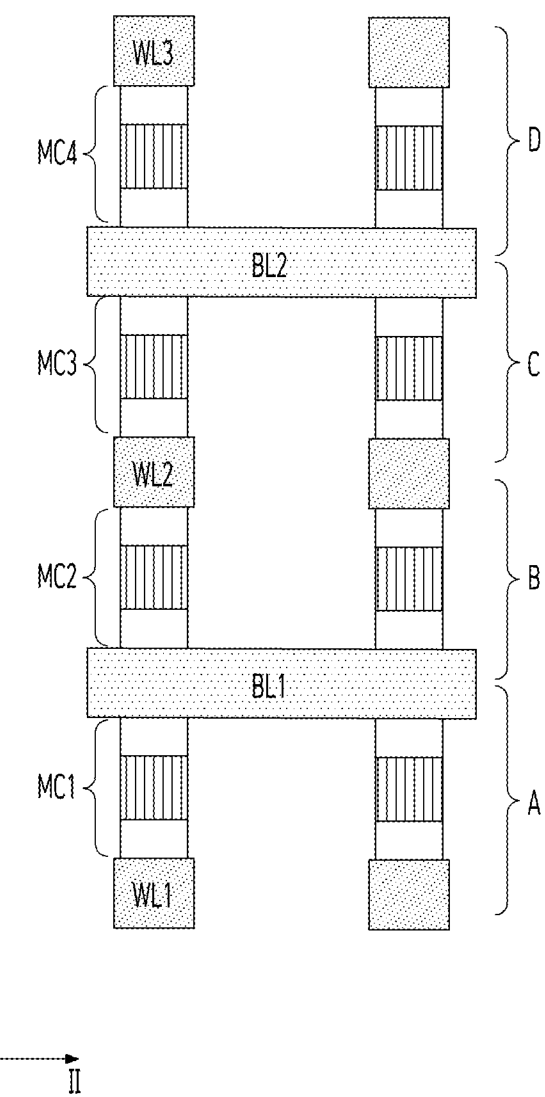

FIGS. 7A and 7B describe a memory cell array of a memory device according to another embodiment of the present disclosure. FIGS. 7A and 7B illustrate a memory cell array in which four decks A, B, C, and D are stacked in a third direction III. The four decks A, B, C, and D may each be a memory deck.

Referring to FIGS. 7A and 7B, the memory cell array of the memory device may include the deck A, the deck B, the deck C, and the deck D that are sequentially stacked in the third direction III.

The deck A may include at least one first access line (e.g., first word line WL1), at least one first memory cell MC1, and at least one second access line (e.g., first bit line BL1).

The first word line WL1 may extend in a first direction I. The first bit line BL1 may extend in a second direction II. The first word line WL1 and the first bit line BL1 may be stacked in the third direction III.

The first memory cell MC1 may be disposed at the intersection of the first word line WL1 and the first bit line BL1. In the deck A, a plurality of first memory cells MC1 may be arranged in the first direction I and the second direction II. The first memory cell MC1 may be connected to and disposed between the first word line WL1 and the first bit line BL1. The first memory cell MC1 may include a lower electrode, a variable resistance layer, and an upper electrode. Alternatively, the first memory cell MC1 may include a switching layer instead of the variable resistance layer, or may include a switching layer in addition to the variable resistance layer.

The deck B may include at least one second access line (e.g., first bit line BL1), at least one second memory cell MC2, and at least one third access line (e.g., second word line WL2).

As described above, the first bit line BL1 may extend in the second direction II, and the second word line WL2 may extend in the first direction I. The second word line WL2 may be stacked over the first bit line BL1 in the third direction III.

The second memory cell MC2 may be disposed at the intersection of the first bit line BL1 and the second word line WL2. In the deck B, a plurality of second memory cells MC2 may be arranged in the first direction I and the second direction II. The second memory cell MC2 may be connected to and disposed between the first bit line BL1 and the second word line WL2. The second memory cell MC2 may include a lower electrode, a variable resistance layer, and an upper electrode. Alternatively, the second memory cell MC2 may include a switching layer instead of the variable resistance layer, or may include a switching layer in addition to the variable resistance layer.

The deck C may include at least one third access line (e.g., second word line WL2), at least one third memory cell MC3, and at least one fourth access line (e.g., second bit line BL2).

As described above, the second word line WL2 may extend in the first direction I. The second bit line BL2 may extend in the second direction II. The second word line WL2 and the second bit line BL2 may be stacked in the third direction III.

The third memory cell MC3 may be disposed at the intersection of the second word line WL2 and the second bit line BL2. In the deck C, a plurality of third memory cells MC3 may be arranged in the first direction I and the second direction II. The third memory cell MC3 may be connected to and disposed between the second word line WL2 and the second bit line BL2. The third memory cell MC3 may include a lower electrode, a variable resistance layer, and an upper electrode. Alternatively, the third memory cell MC3 may include a switching layer instead of the variable resistance layer, or may include a switching layer in addition to the variable resistance layer.

The deck D may include at least one fourth access line (e.g., second bit line BL2), at least one fourth memory cell MC4, and at least one fifth access line (e.g., third word line WL3).

As described above, the second bit line BL2 may extend in the second direction II. The third word line WL3 may extend in the first direction I. The third word line WL3 may be stacked over the second bit line BL2 in the third direction III.

The fourth memory cell MC4 may be disposed at the intersection of the second bit line BL2 and the third word line WL3. In the deck D, a plurality of fourth memory cells MC4 may be arranged in the first direction I and the second direction II. The fourth memory cell MC4 may be connected to and disposed between the second bit line BL2 and the third word line WL3. The fourth memory cell MC4 may include a lower electrode, a variable resistance layer, and an upper electrode. Alternatively, the fourth memory cell MC4 may include a switching layer instead of the variable resistance layer, or may include a switching layer in addition to the variable resistance layer.

As described above, the memory cell array of the memory device may include the deck A, the deck B, the deck C, and the deck D that are sequentially stacked in the third direction III. Furthermore, the deck A and the deck B may share the at least one first bit line BL1, the deck B and the deck C may share the at least one second word line WL2, and the deck C and the deck D may share the at least one second bit line BL2.

Figure 8:
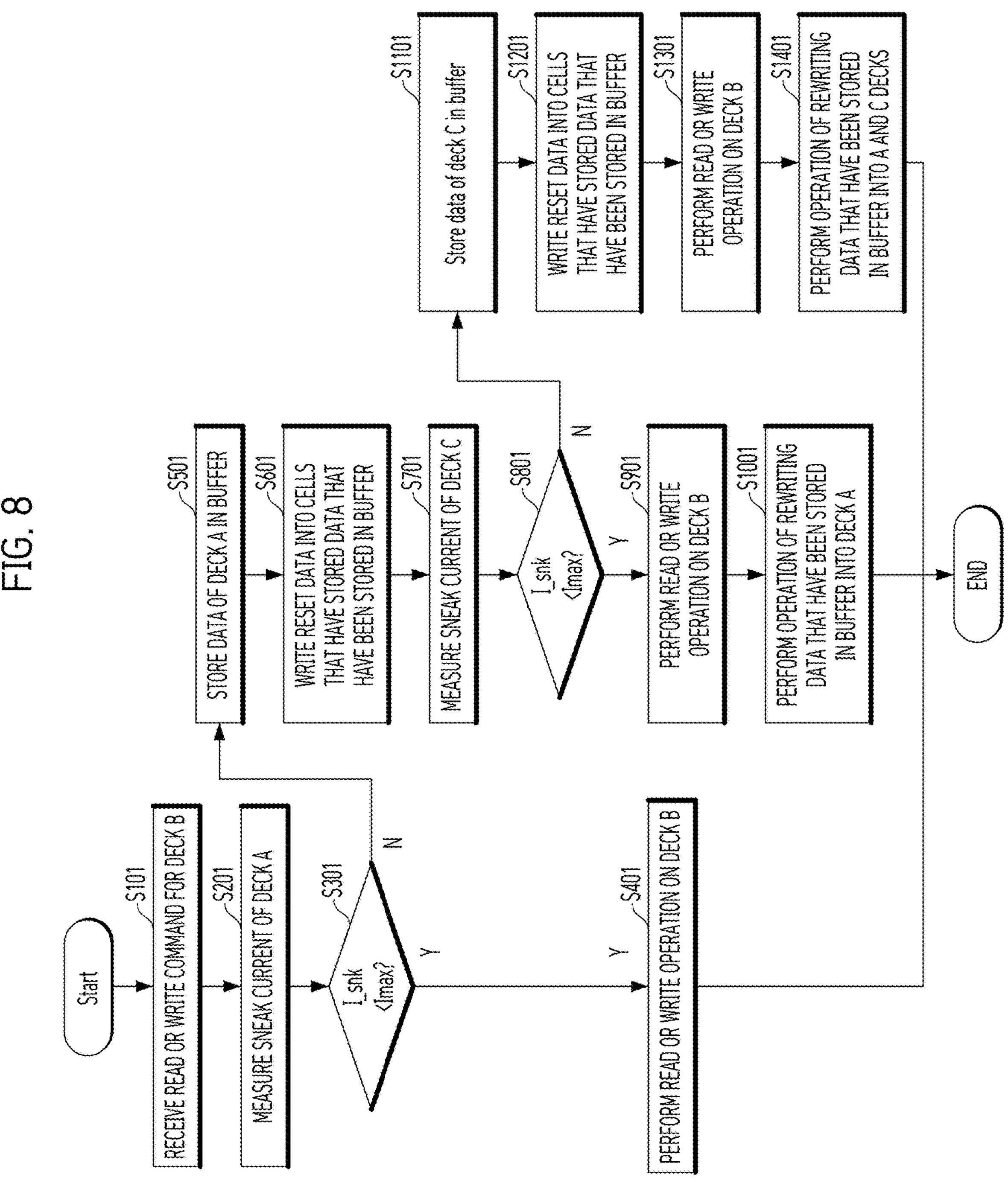
FIG. 8 is a flowchart for describing an operating method of a memory device according to another embodiment of the present disclosure.

FIG. 8 is a flowchart for describing an operating method of a memory device according to another embodiment of the present disclosure. The operating method shown in FIG. 8 will be described with reference to the memory cell array illustrated in FIGS. 7A and 7B and the memory device 100 and the memory controller 200 illustrated in FIG. 1.

In this embodiment, it is assumed that the number of errors occurring in data DATA output from the deck B is greater than a preset number. Accordingly, sneak currents I_snk of the decks A and C that are most adjacent to the deck B are measured when the memory device 100 receives a command CMD for performing a read or write operation on the deck B from the memory controller 200.

Referring to FIG. 8, the operating method may include a command reception step S101, a first sneak current measurement step S201, a first current comparison step S301, a first command execution step S401, a first preparation operation execution step including steps S501 and S601, a second sneak current measurement step S701, a second current comparison step S801, a second command execution step S901, a first recovery step S1001, a second preparation operation execution step including steps S1101 and S1201, a third command execution step S1301, and a second recovery step S1401.

The command reception step S101 may include receiving the command CMD for the deck B. In this case, it is assumed that the deck B has a problem both in storing data received from the memory controller 200 and in outputting data stored in the deck B.

The first sneak current measurement step S201 may include measuring the sneak current I_snk of the deck A. In this case, as illustrated in FIGS. 7A and 7B, the deck A may share the bit line BL1 with the deck B. The sneak current I_snk of the deck A for a selected bit line S_BL may be measured by the current detection circuit 150. The selected bit line S_BL is selected by an address that has been received along with the command CMD in the command reception step S101, among bit lines BL1 shared by the deck A and the deck B. That is, when receiving the command CMD for the deck B, the control circuit 110 may control the current detection circuit 150 to measure the sneak current I_snk of the deck A.

The first current comparison step S301 may include comparing the measured sneak current I_snk of the deck A and a preset current Imax. For example, the first current comparison step S301 may include receiving, by the control circuit 110, a detection result I_d of the sneak current I_snk of the deck A from the current detection circuit 150 and comparing the received detection result I_d and the preset current Imax.

When it is determined in the first current comparison step S301 that the sneak current I_snk of the deck A is smaller than the preset current Imax (Y), the first command execution step S401 may be performed.

The first command execution step S401 may include executing the command CMD received in the command reception step S101. That is, the command CMD for the deck B may be executed without performing the first preparation operation execution step, S501 and S601.

On the other hand, when it is determined in the first current comparison step S301 that the sneak current I_snk of the deck A is equal to or greater than the preset current Imax (N), the first preparation operation execution step, S501 and S601, may be performed.

The first preparation operation execution step, S501 and S601, may be performed before the command CMD for the deck B is executed, and may include transferring the data of the deck A into the buffer 141 and writing reset data into the deck A. Hereinafter, for illustrative convenience, the data of the deck A will be referred to as 'first data.'

In the first preparation operation execution step, S501 and S601, step S501 of transferring the first data of the deck A into the buffer 141 may include storing, in the buffer 141, the first data stored in memory cells of the deck A that shares the selected bit line S_BL.

Step S601 of writing the reset data into the deck A may include writing the reset data into the memory cells of the deck A in which the first data currently stored in the buffer 141 was originally stored. In this case, the reset data may be data corresponding to a higher resistance value compared to set data. That is, a resistance value of a memory cell that stores the reset data may be higher than a resistance value of a memory cell that stores the set data.

When the first preparation operation execution step, S501 and S601, is completed, the second sneak current measurement step S701 may be performed.

The second sneak current measurement step S701 may include measuring the sneak current I_snk of the deck C. In this case, as illustrated in FIGS. 7A and 7B, the deck C may share the word line WL2 with the deck B. The sneak current I_snk of the deck C for a selected word line may be measured by the current detection circuit 150. The selected word line is selected by an address received along with the command CMD in the command reception step S101, among word lines WL2 shared by the deck B and the deck C. That is, when receiving the command CMD for the deck B, the control circuit 110 may control the current detection circuit 150 to measure the sneak current I_snk of the deck C.

The second current comparison step S801 may include comparing the measured sneak current I_snk of the deck C and the preset current Imax. For example, the second current comparison step S801 may include receiving, by the control circuit 110, a detection result I_d of the sneak current I_snk of the deck C from the current detection circuit 150 and comparing the received detection result I_d and the preset current Imax.

When it is determined in the second current comparison step S801 that the sneak current I_snk of the deck C is smaller than the preset current Imax (Y), the second command execution step S901 may be performed.

The second command execution step S901 may include executing the command CMD received in the command reception step S101, that is, performing a read or write operation on the deck B, after the first preparation operation execution step, S501 and S601, is performed.

After the second command execution step S901 is performed, the first recovery step S1001 may be performed.

The first recovery step S1001 may include restoring the first data of the memory cells of the deck A into which the reset data has been written in step S601. For example, the first recovery step S1001 may include rewriting, into the deck A, the first data stored in the buffer 141. In this case, the first recovery step S1001 may include storing, in the memory cells of the deck A, the first data received from the buffer 141, under the control of the control circuit 110.

On the other hand, when it is determined in the second current comparison step S801 that the sneak current I_snk of the deck C is equal to or greater than the preset current Imax (N), the second preparation operation execution step, S1101 and S1201, may be performed.

The second preparation operation execution step, S1101 and S1201, may include step S1101 of storing the data of the deck C in the buffer 141 and step S1201 of writing reset data into the deck C. Hereinafter, for illustrative convenience, the data of the deck C will be referred to as 'second data.'

Step S1101 of storing the second data of the deck C in the buffer 141 may include transferring, into the buffer 141, the second data stored in memory cells of the deck C that share the word line WL2 with the deck B. The shared word line WL2 is selected by the address received along with the command CMD in the command reception step S101.

Step S1201 of writing the reset data in the deck C may include writing the reset data into the memory cells of the deck C in which the second data currently stored in the buffer 141 was originally stored. In this case, the reset data may be data corresponding to a higher resistance value compared to set data. That is, a resistance value of a memory cell that stores the reset data may be higher than a resistance value of a memory cell that stores the set data.

When the second preparation operation execution step, S1101 and S1201, is completed, the third command execution step S1301 may be performed.

The third command execution step S1301 may include executing the command CMD received in the command reception step S101, that is, performing the read or write operation on the deck B. That is, the third command reception step S1301 may include executing the command CMD after the first and second preparation operation execution steps, S501 and S601, and S1101 and S1201, have been completed.

The second recovery step S1401 may include restoring the first and second data of the deck A and the deck C into which the reset data have been written in step S601 and step S1201. For example, the second recovery step S1401 may include rewriting, into the deck A and the deck C, the first and second data stored in the buffer 141. In this case, the second recovery step S1401 may include transferring, into the memory cells of the deck A and the deck C, the first and second data stored in the buffer 141, respectively, under the control of the control circuit 110.

As described above, according to the embodiment of the present disclosure illustrated in FIGS. 7A, 7B, and 8, the memory device may include the memory cell array in which the four decks A, B, C, and D are stacked in the third direction III and share bit lines (or word lines). If an error continuously occurs in a read operation for one specific deck, e.g., the deck B, among the four decks A, B, C, and D, or if the number of errors occurring in the read operation is increased, when a read or write command for the deck B is received, the sneak currents of the decks A and C that share bit or word lines with the specific deck B may be sequentially measured before the received command is executed. At this time, when the sneak current of the deck A is equal to or greater than a preset current, data stored in memory cells of the deck A may be transferred into the buffer 141. After that, data (e.g., reset data) corresponding to a high resistance value may be written into the memory cells of the deck A. Thereafter, when the sneak current of the deck C is smaller than the preset current, the read or write command may be executed on the deck B. On the other hand, when the sneak current of the deck C is equal to or greater than the preset current, data stored in memory cells of the deck C may be transferred into the buffer 141. Reset data may be written into the memory cells of the deck C. Accordingly, when the deck B is accessed, current leakage through the decks A and C can be reduced.

Accordingly, according to the embodiment of the present disclosure, the memory device 100 can perform a normal read or write operation.

Although embodiments according to the technical spirit of the present disclosure have been described above with reference to the accompanying drawings, the embodiments have been provided to merely describe embodiments according to the concept of the present disclosure, and the present disclosure is not limited to the embodiments. A person having ordinary knowledge in the art to which the present disclosure pertains may substitute, modify, and change the embodiments in various ways without departing from the technical spirit of the present disclosure written in the claims. Such substitutions, modifications, and changes may be said to belong to the scope of the present disclosure.

What is claimed is:

1. A memory device comprising:

a memory cell array in which a plurality of decks are stacked;

a control circuit configured to perform a read or write operation on a target deck of the plurality of decks;

a current detection circuit configured to measure a sneak current flowing through at least one deck among the plurality of decks, the at least one deck being adjacent to the target deck; and a buffer configured to store data transferred from memory cells of the at least one deck, wherein the control circuit is configured to execute a read or write command to perform the read or write operation on the target deck after the sneak current flowing through the at least one deck is measured, wherein when the sneak current is determined to be smaller than a preset current, the read or write operation is performed on the target deck without transferring data stored in the memory cells of the at least one deck into the buffer and without storing reset data in the memory cells of the at least one deck.

2. The memory device of claim 1, wherein the read or write command is executed after the sneak current flowing through the at least one deck is measured when it is determined that the target deck has a problem in storing data and outputting data stored in the target deck.

3. The memory device of claim 2, wherein the control circuit controls the current detection circuit to measure the sneak current flowing through the at least one deck that shares a word line or a bit line with the target deck.

4. The memory device of claim 2, wherein when the sneak current is equal to or greater than the preset current, the control circuit controls the buffer to store the data transferred from the memory cells of the at least one deck.

5. The memory device of claim 4, wherein the control circuit controls the memory cells of the at least one deck to store the reset data after the data transferred from the memory cells of the at least one deck is stored in the buffer.

6. The memory device of claim 5, wherein the control circuit performs the read or write operation on the target deck after the reset data is stored in the memory cells of the at least one deck.

7. The memory device of claim 6, wherein the control circuit is configured to write the data stored in the buffer into the memory cells of the at least one deck after the read or write operation is performed on the target deck.

8. The memory device of claim 5, wherein:

the memory cells store set data instead of the reset data, wherein the reset data corresponds to a higher resistance value compared to set data.

9. The memory device of claim 1, wherein the control circuit is configured to select the memory cells of the at least one deck based on an address that is received with the read or write command to access the target deck.

10. An operating method of a memory device, the method comprising:

receiving a command to perform a read or write operation on a target deck that is determined as having difficulty in storing or outputting data among a plurality of decks stacked within a memory cell array of the memory device;

measuring a sneak current flowing through a first deck among the plurality of decks, the first deck being adjacent to the target deck;

comparing the sneak current with a preset current;

transferring, into a buffer, data stored in memory cells of the first deck based on a result of the comparison;

storing reset data in the memory cells of the first deck;

performing the read or write operation on the target deck in response to the command; and writing, into the memory cells of the first deck, the data stored in the buffer, wherein when the sneak current is determined to be smaller than the preset current as a result of the comparison, the read or write operation is performed on the target deck without performing the transferring and the storing reset data.

11. The operating method of claim 10, wherein when the sneak current is determined to be equal to or greater than the preset current as a result of the comparison, the transferring and the storing reset data are performed.

12. The operating method of claim 10, further comprising measuring a sneak current flowing through a second deck that is adjacent to the target deck among the plurality of decks, after storing the reset data in the memory cells of the first deck.

13. The operating method of claim 12, further comprising comparing the sneak current flowing through the second deck with the preset current, wherein when the sneak current of the second deck is determined to be smaller than the preset current as a result of the comparison, the read or write operation on the target deck is performed.

14. The operating method of claim 13, wherein, when the sneak current of the second deck is determined to be equal to or greater than the preset current, the method further comprises:

transferring, into the buffer, data stored in memory cells of the second deck, and storing the reset data in the memory cells of the second deck.

15. The operating method of claim 14, wherein after the reset data is stored in the memory cells of the second deck, the read or write operation on the target deck is performed.

16. The operating method of claim 14, wherein the memory cells of the first and second decks are selected based on an address that is received with the read or write command to access the target deck.

17. The operating method of claim 12, wherein each of the first deck and the second deck shares a word line or a bit line with the target deck.

18. The operating method of claim 10, wherein until the sneak current of the first deck is determined to be smaller than the preset current, the method performs the measuring, the comparing, the transferring, and the storing one or more times, and wherein the memory cells of the first deck include one or more sets of memory cells, the transferring and the storing are performed for each of one or more sets of memory cells when the method performs the transferring and the storing one or more times.

19. The operating method of claim 18, wherein the writing comprises writing, into the one or more sets of memory cells of the first deck, data stored in the buffer.

* * * * *